United States Patent [19]
Kernon et al.

[11] Patent Number: 5,344,162
[45] Date of Patent: Sep. 6, 1994

[54] SEALING RING FOR GAS TURBINE ENGINES

[75] Inventors: John D. Kernon, Clevedon; Mark J. Knight, Alveley, both of England

[73] Assignee: Rolls-Royce plc, London, England

[21] Appl. No.: 7,962

[22] Filed: Jan. 22, 1993

[30] Foreign Application Priority Data

Feb. 29, 1992 [GB] United Kingdom ............ 9204421

[51] Int. Cl.$^5$ ............................................ F16J 15/42
[52] U.S. Cl. ................................. 277/25; 277/174; 277/222
[58] Field of Search ................. 277/25, 173, 174, 177, 277/220, 222

[56] References Cited

U.S. PATENT DOCUMENTS

| | | |
|---|---|---|
| 2,570,427 | 10/1951 | Chillson et al. ............ 277/25 |
| 2,652,298 | 9/1953 | Estey ........................ 277/173 |
| 2,877,070 | 3/1959 | Lee ........................ 277/173 X |
| 3,512,788 | 5/1970 | Kilbane ..................... 277/25 X |
| 3,887,198 | 6/1975 | McClure et al. ............ 277/173 X |
| 4,180,273 | 12/1979 | Takagi et al. . | 
| 4,198,063 | 4/1980 | Shimizu et al. . |
| 5,169,159 | 12/1992 | Pope et al. ............ 277/173 X |

FOREIGN PATENT DOCUMENTS

| | | |
|---|---|---|
| 0118642 | 9/1984 | European Pat. Off. . |
| 0139397 | 5/1985 | European Pat. Off. . |
| 1295293 | 5/1969 | Fed. Rep. of Germany ........ 277/25 |
| 2816084 | 10/1978 | Fed. Rep. of Germany ........ 277/25 |
| 3609578A1 | 8/1987 | Fed. Rep. of Germany . |
| 1019897 | 1/1953 | France .................. 277/222 |
| 819082 | 8/1959 | United Kingdom ............. 277/173 |
| 2151721 | 7/1985 | United Kingdom . |
| 2223067 | 3/1990 | United Kingdom . |

OTHER PUBLICATIONS

Taschenberg, "Circumferential Seals", Machine Design, 45:27–29, Sep. 13, 1973.

Primary Examiner—William A. Cuchlinski, Jr.
Assistant Examiner—Scott W. Cummings
Attorney, Agent, or Firm—Oliff & Berridge

[57] ABSTRACT

A sealing ring for controlling gas leakage through the annular space between two rotating concentric members; for example engine shafts. The sealing ring 20 has a generally trapezoidal cross section and an overlapping scarf joint. The sealing ring improves sealing by providing continuous lines of contact at edges between inner and outer coaxial shaft members.

5 Claims, 2 Drawing Sheets

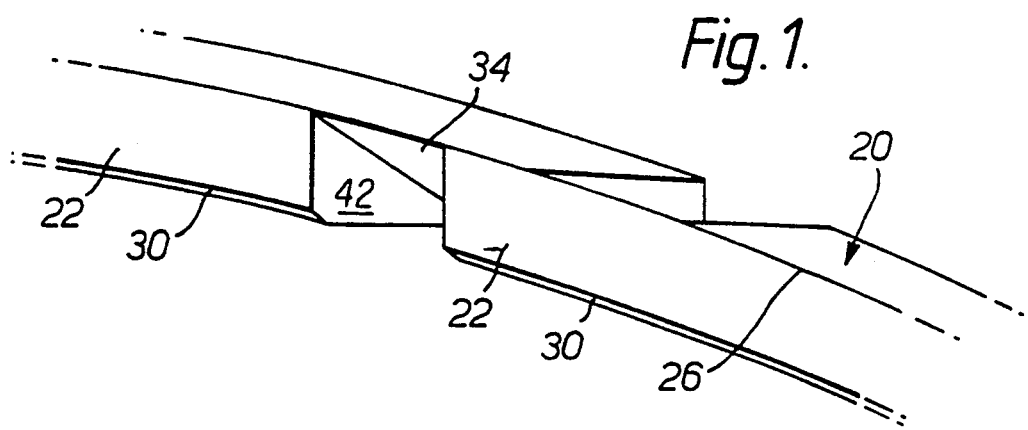
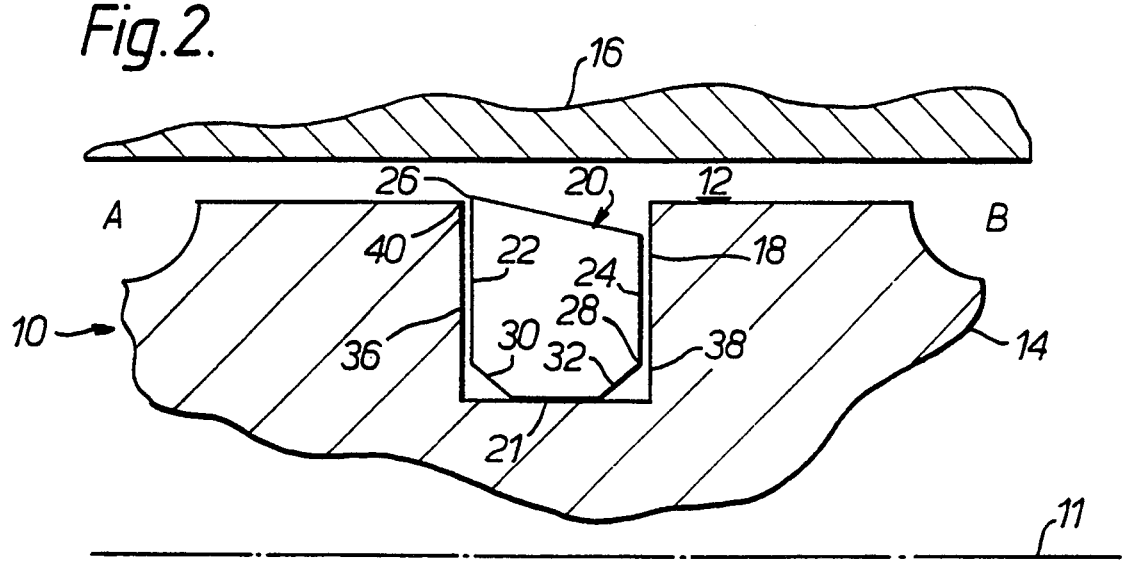
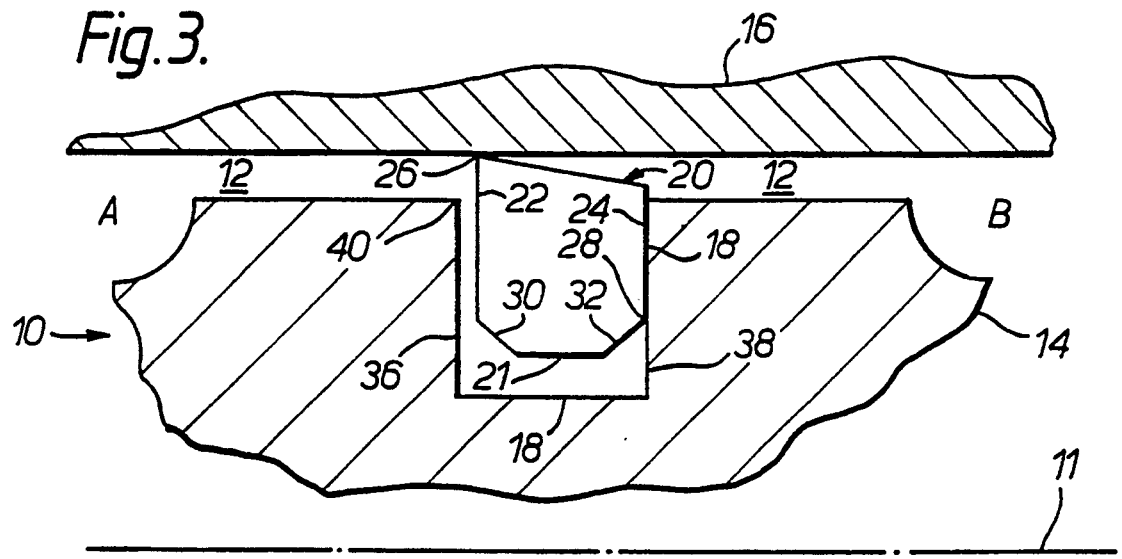

SEALING RING FOR GAS TURBINE ENGINES

BACKGROUND OF THE INVENTION

The present invention relates to sealing rings, and in particular sealing rings in gas turbine engines.

It is common in gas turbine engine rotor assemblies to find annular gaps disposed between co-axial rotatable members. In use, many of these gaps require sealing in order to prevent leakage of high pressure gases into low pressure regions.

In gas turbine engines, it is known to use piston type sealing rings located in circumferential grooves machined in the surface of the inner shaft member to control such leakage. Conventional sealing rings having a rectangular toroidal section and an overlapping scarf joint, the plane of which is disposed parallel to the radial surfaces of the ring, have however, in sealing arrangements of this type, proved to perform less than satisfactory. During operation, that is under the influence of rotational loading, the sealing ring expands outwardly, eventually being restrained by the internal surface of the outer member, resulting in a leakage path being created through the expanded scarf joint.

Additional leakage can also occur with this conventional type of sealing ring unless a costly zero axial clearance fit is maintained between the ring and the groove.

SUMMARY OF THE INVENTION

Accordingly, it is an object of the present invention to provide an improved sealing ring for sealing an annular gap between an inner and an outer rotatable member, the sealing ring including; a first pair of adjoining surfaces that together define a first edge, which in use provides a continuous line of contact between the sealing ring and the outer rotatable member.

Preferably, the first edge is axially offset from the centroid of the ring, which in use causes the toroidal cross section of the ring to rotate about the first edge.

BRIEF DESCRIPTION OF THE DRAWINGS

The invention will now be described in greater detail with reference, by way of example only, to the accompanying drawings, in which:

FIG. 1 is a perspective view of a portion of the sealing ring including the scarfed joint, FIG. 2 is a detailed section view of the stationary sealing ring according to an embodiment of the present invention, FIG. 3 is a detailed section view of the fully expanded sealing ring.

DETAILED DESCRIPTION OF PREFERRED EMBODIMENTS

Figure 4:
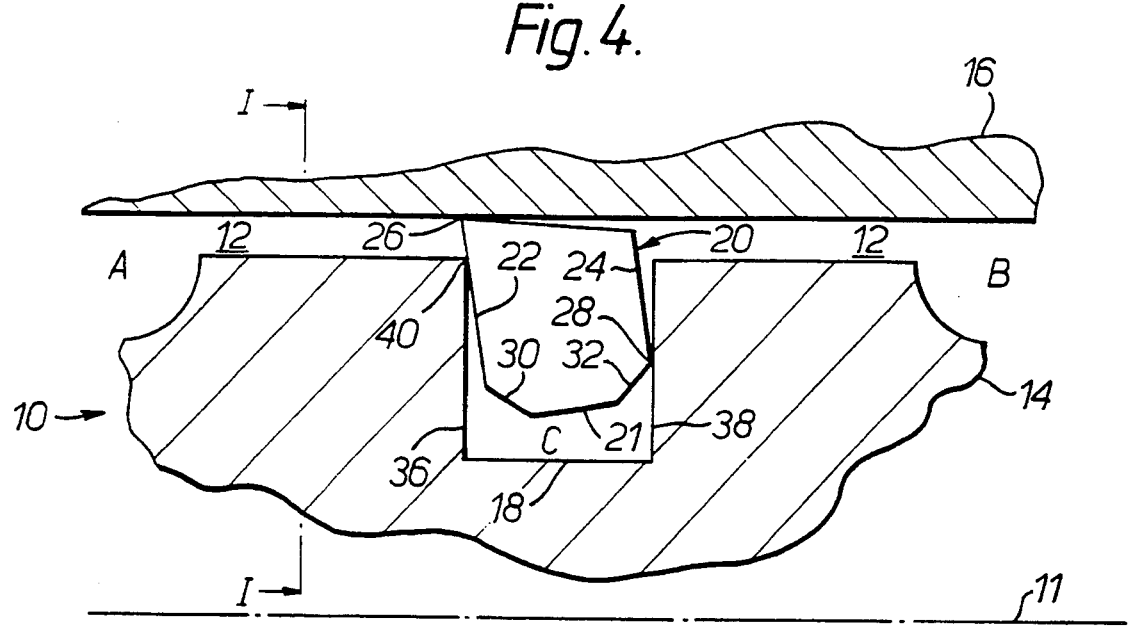
FIG. 4 is a detailed section view of the sealing ring at the operating condition.

Referring to the embodiment of FIGS. 1 and 2, a rotor assembly 10 having an axis 11 has an annular gap 12 defined between coaxial inner and outer cylindrical shaft members 14 and 16 respectively. Inner shaft member 14 has a circumferential groove 18 formed in its external surface for receiving an inwardly sprung sealing ring 20, with axial clearance.

Sealing ring 20 has a generally trapezoidal cross section defining parallel radial surfaces 22 and 24, a radially outermost edge 26, and an edge 28. In addition chamfered surfaces 30 and 32 are defined between the internal surface 21 of ring 20 and radial surfaces 22 and 24. An overlapping scarfed joint 34 is formed at the ends of sealing ring 20, with the plane of the scarf lying between edges 26 and 28.

It will be noted that radially outermost edge 26 is axially offset from the centroid of the ring. This offset may be further increased by machining surface 30 to a greater depth and at a greater angle relative to its adjoining radial surface, than the corresponding chamfered surface 32.

Referring now to FIG. 3, sealing ring 20 expands radially outwards during acceleration of rotor assembly 10. Initially, sealing ring 20 expands against its inherent radial stiffness under the influence of its increasing rotational load. This expansion continues until sealing ring 20 is radially restrained at its radially outermost edge 26 by outer shaft member 16. Radially outermost edge 26 thereby defines a continuous line of contact between sealing ring 20 and outer shaft member 16. The line of contact being continuous by virtue of scarf joint 34 having sufficient overlap to accommodate the required circumferential expansion.

Figure 5:
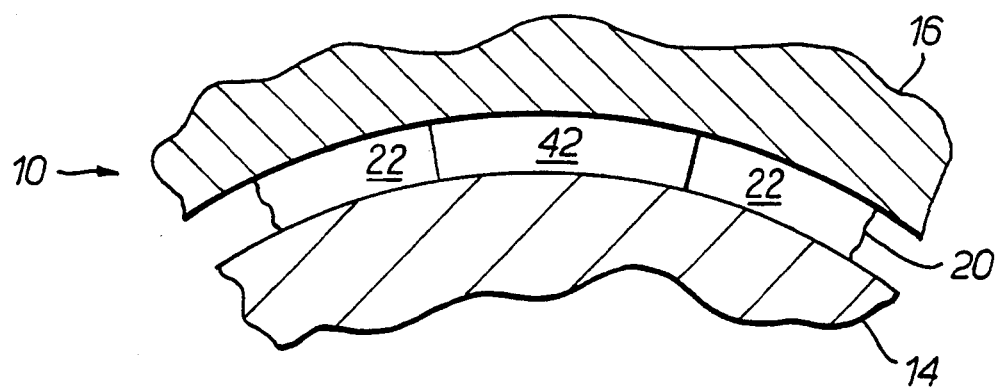
FIG. 5 is a section view on the line I—I in FIG. 4.

Referring now to FIGS. 4 and 5, as rotor assembly 10 accelerates further, the additional rotational load generated by sealing ring 20 is applied to outer shaft member 16, at the line of contact. Consequently, the applied and the reaction force acting on sealing ring 20 define a couple acting on the toroidal cross section of the ring. Under the influence of the couple, the toroidal cross section rotates within circumferential groove 18 until edge 28 contacts wall 38 and radial surface 22 contacts edge 40. The roll angle is determined by axial clearances within circumferential groove 18. Edge 28 thereby defines a continuous line of contact between sealing ring 20 and inner shaft member 14, again continuous by virtue of scarf joint 34 having sufficient overlap to accommodate the required circumferential expansion. Additionally, a discontinuous line of contact is defined between sealing ring 20 and edge 40 of circumferential groove 18.

Preferably, radially outermost edge 26 is disposed axially towards a high pressure region A. In which case the discontinuous line of contact at edge 40 combined with expanded scarf joint 34, defines a small leakage orifice 42 between cavity C and high pressure region A. Consequently sealing ring 20 is exposed to a radial pressure differential forcing it outwards.

The two continuous lines of contact defined at the radially and axially restrained edges, 26 and 28 respectively, provide a continuous annular seal in annular gap 12, sealing a high pressure region A from a low pressure region B.

We claim:

1. A rotor assembly comprising a first rotatable member having a surface with a groove formed therein, a second rotatable member concentric with the first member and spaced apart therefrom to define an annular gap therebetween, and an expandable sealing ring located in the groove for sealing the annular gap, the sealing ring comprising:

a first pair of adjoining surfaces defining a first edge, said first edge being the radially outermost part of the sealing ring, and a second pair of adjoining surfaces defining a second edge diagonally opposite and spaced a predetermined distance from the first edge, and an expandable scarf joint connecting circumferential ends of said sealing ring, wherein said predetermined distance is defined to permit, via the centrifugal force generated when the rotor is rotated at high speed, the first edge to sealingly contact the second member, the second edge to sealingly contact the groove, and one of the first pair of adjoining surfaces to contact the groove, wherein the plane of the scarf joint lies between the first and second edges of the ring so that continuous line seal contacts are maintained at both the first and second edges of the ring.

2. A sealing ring as claimed in claim 1, wherein the first edge is axially disposed towards a high pressure region and the second edge is axially disposed towards a low pressure region.

3. A sealing ring as claimed in claim 1, wherein the ring is inwardly sprung in the groove.

4. A sealing ring as claimed in claim 1, wherein an initial axial clearance exists between the ring and the groove.

5. A sealing ring as claimed in claim 1, wherein one of the second pair of adjoining surfaces defines a chamfer.

* * * * *